(12) United States Patent
Marshall et al.

(10) Patent No.: US 7,366,297 B1
(45) Date of Patent: Apr. 29, 2008

(54) METHOD AND SYSTEM FOR CONVERTING ALTERNATING CURRENT TO ETHERNET IN-LINE POWER

(75) Inventors: Robert A. Marshall, Georgetown, TX (US); James R. Sisk, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 10/443,938

(22) Filed: May 21, 2003

(51) Int. Cl.
*H04M 1/00* (2006.01)

(52) U.S. Cl. .................................. 379/413.03

(58) Field of Classification Search .............................. 379/413.01–413.04
See application file for complete search history.

(56) References Cited

U.S. PATENT DOCUMENTS

| | | | |
|---|---|---|---|
| 4,131,767 A | 12/1978 | Weinstein | 179/170.2 |
| 4,161,719 A | 7/1979 | Parikh et al. | 340/147 SY |
| 4,232,199 A | 11/1980 | Boatwright et al. | 179/18 B |
| 4,397,020 A | 8/1983 | Howson | 370/105 |
| 4,532,626 A | 7/1985 | Flores et al. | 370/85 |
| 4,599,494 A | 7/1986 | Welty | 179/84 T |
| 4,626,954 A | 12/1986 | Damiano et al. | 361/96 |
| 4,710,949 A | 12/1987 | Ahuja | 379/26 |
| 4,723,267 A | 2/1988 | Jones et al. | 379/93 |
| 4,875,223 A | 10/1989 | Curtis | 375/36 |
| 4,969,179 A | 11/1990 | Kanare et al. | 379/33 |
| 5,029,201 A | 7/1991 | Bindels | 379/98 |
| 5,034,948 A | 7/1991 | Mizutani et al. | 379/79 |
| 5,056,131 A | 10/1991 | Kanare et al. | 379/33 |
| RE33,900 E | 4/1992 | Howson | 370/105 |
| 5,199,049 A | 3/1993 | Wilson | 375/104 |
| 5,223,806 A | 6/1993 | Curtis et al. | 333/12 |
| 5,285,144 A * | 2/1994 | Hsu et al. | 318/807 |
| 5,311,518 A | 5/1994 | Takato et al. | 370/110.1 |
| 5,321,372 A | 6/1994 | Smith | 333/1 |
| 5,406,260 A | 4/1995 | Cummings et al. | 340/568 |
| 5,541,957 A | 7/1996 | Lau | 375/258 |
| 5,574,748 A | 11/1996 | Vander Mey et al. | 375/204 |
| 5,612,580 A * | 3/1997 | Janonis et al. | 307/64 |
| 5,655,077 A | 8/1997 | Jones et al. | 395/187.01 |
| 5,659,542 A | 8/1997 | Bell et al. | 370/496 |
| 5,671,354 A | 9/1997 | Ito et al. | 395/187.01 |
| 5,684,950 A | 11/1997 | Dare et al. | 395/187.01 |
| 5,796,185 A | 8/1998 | Takata et al. | 307/140 |

(Continued)

FOREIGN PATENT DOCUMENTS

WO    WO 99/53408    10/1999

OTHER PUBLICATIONS

U.S. Appl. No. 60/448,912, filed Feb. 21, 2003, Parker et al, "A Connector Module with Embedded Power-Over-Ethernet Functionality" United States Patent and Trademark Office.*

(Continued)

*Primary Examiner*—Ramnandan Singh
(74) *Attorney, Agent, or Firm*—Baker Botts L.L.P.

(57) ABSTRACT

According to one embodiment, a method for converting alternating current voltage signals to Ethernet in-line power includes converting an alternating current voltage signal to an approximate direct current voltage signal, adding at least one odd harmonic of the approximate direct current voltage signal to produce a compensated direct current voltage signal, and conditioning the compensated direct current voltage signal to produce an Ethernet in-line power signal.

29 Claims, 2 Drawing Sheets

U.S. PATENT DOCUMENTS

| | | | |
|---|---|---|---|
| 5,799,040 A | 8/1998 | Lau | 375/258 |
| 5,802,042 A | 9/1998 | Natarajan et al. | 370/255 |
| 5,815,665 A | 9/1998 | Teper et al. | 395/200.59 |
| 5,918,016 A | 6/1999 | Brewer et al. | 395/200.5 |
| 5,944,824 A | 8/1999 | He | 713/201 |
| 5,947,773 A | 9/1999 | Karam | 439/676 |
| 5,991,885 A * | 11/1999 | Chang et al. | 713/300 |
| 5,994,998 A | 11/1999 | Fisher et al. | 340/310.01 |
| 6,011,910 A | 1/2000 | Chau et al. | 395/200.59 |
| 6,021,496 A | 2/2000 | Dutcher et al. | 713/202 |
| 6,047,376 A | 4/2000 | Hosoe | 713/201 |
| 6,092,196 A | 7/2000 | Reiche | 713/200 |
| 6,115,468 A | 9/2000 | De Nicolo | 379/413 |
| 6,134,666 A | 10/2000 | De Nicolo | 713/300 |
| 6,140,911 A | 10/2000 | Fisher et al. | 340/310.01 |
| 6,141,227 A * | 10/2000 | Sheikh et al. | 363/41 |
| 6,218,930 B1 | 4/2001 | Katzenberg et al. | 340/310.01 |
| 6,295,356 B1 | 9/2001 | De Nicolo | 379/413 |
| 6,308,240 B1 | 10/2001 | De Nicolo | 710/300 |
| 6,310,781 B1 | 10/2001 | Karam | 361/764 |
| 6,347,949 B1 | 2/2002 | Edwards et al. | 439/170 |
| 6,348,874 B1 * | 2/2002 | Cole et al. | 340/825.01 |
| 6,535,983 B1 * | 3/2003 | McCormack et al. | 713/310 |
| 6,541,878 B1 | 4/2003 | Diab | 307/17 |
| 6,678,176 B2 * | 1/2004 | Lumsden | 363/95 |
| 6,704,213 B2 * | 3/2004 | Steimer | 363/61 |
| 6,762,675 B1 | 7/2004 | Cafiero et al. | 340/10.42 |
| 6,804,351 B1 | 10/2004 | Karam | 379/413 |
| 2002/0063584 A1 | 5/2002 | Molenda et al. | 327/67 |
| 2002/0180592 A1 * | 12/2002 | Gromov | 340/310.01 |
| 2004/0002319 A1 * | 1/2004 | Lin | 455/318 |
| 2004/0156496 A1 | 8/2004 | Karam | 379/413 |
| 2004/0164619 A1 * | 8/2004 | Parker et al. | 307/80 |
| 2005/0276023 A1 * | 12/2005 | Zansky et al. | 361/731 |

OTHER PUBLICATIONS

Kiss, Peter (candidate), "Chapter 3, Cascaded Delta-Sigma ADCs", Thesis; "Politehnica" University of Timisoara; cover page plus pp. 45-71, Aug. 20, 1999, revised: Dec. 31, 1999.

Daniel Dove, Powerpoint Presentation, "Power over the DTE", Jan. 2000.

Robert Muir, Powerpoint Presentation: "Update on Diode Discovery Process", May 2000.

"Data Terminal Equipment (DTE) Power via Media Dependent Interface (MDI)", IEEE P802.3af/D3.01 (Revision of IEEE Std. 802.3-2000), May 2002.

"33. Data Terminal Equipment (DTE) Power via Media Dependent Interface (MDI)", Draft Supplement to IEEE Standard 802.3 (IEEE Draft P802.3af/D3.2), Sep. 5, 2002.

"Amendment: Data Terminal Equipment (DTE) Power via Media Dependent Interface (MDI)", IEEE Draft P802.3af/D4.3, (IEEE Standards Department, Draft Amendment 802-3-2002), Apr. 2003.

Hugh Barrass, "Multi-Pair Aggregate Power Distribution"—U.S. Appl. No. 10/287,886, pp. 1-25, Nov. 4, 2002.

Jeffrey D. Provost, "Inline Power Control"—U.S. Appl. No. 10/618,211, pp. 1-15, Jul. 11, 2003.

Daniel C. Biederman, "Inline Power Based Device Communications"—U.S Appl. No. 10/651,596, pp. 1-27, Aug. 29, 2003.

Cafiero, et al. "Method and Apparatus for Remote Powering of Device Connected to Network"—U.S. Appl. No. 10/836,923, pp. 1-16, Apr. 29, 2004.

Roger A. Karam, "Method and Apparatus for Detecting a Compatible Phantom Powered Device Using Common Mode Signaling"—U.S. Appl. No. 10/855,212, pp. 1-29, May 26, 2004.

* cited by examiner

METHOD AND SYSTEM FOR CONVERTING ALTERNATING CURRENT TO ETHERNET IN-LINE POWER

TECHNICAL FIELD OF THE INVENTION

This invention relates generally to power conversion and more particularly to a method and system for converting an alternating current to Ethernet in-line power.

BACKGROUND OF THE INVENTION

Alternating current is the standard for power sources. However, many electrical and electronic devices require direct current power supplies. To address this need, power conversion is performed. Power conversion often involves both converting an alternating current source to a direct current as well as scaling the magnitude of the signal to an appropriate level.

Ethernet devices, such as Ethernet switches, computers, and other devices generally require a 48 volt direct current signal. In addition, this signal is often current-limited to meet Ethernet standards. Some Ethernet devices can accommodate in-line power, meaning an associated Ethernet switch provides power in conjunction with the providing of data to the Ethernet device. Other Ethernet devices, often referred to as legacy devices, do not accommodate such in-line power, and utilize separate power sources.

Conventionally, in Ethernet applications, power conversion involves two power conversion stages. The first is often referred to as a power factor correction stage in which an 85 to 265 Vrms alternating current signal is converted to a constant 400 volt direct current signal. The second stage provides isolation from the alternating current line and converts the 400 volt direct current signal to an output voltage of 48 volts DC. An in-line power detection circuit adds a third stage for Ethernet applications involving both legacy and in-line power compatible devices. The use of three stages to convert from an available alternating current signal to an Ethernet in-line power signal often requires too much equipment volume, is inefficient, and is costly.

SUMMARY OF THE INVENTION

According to one embodiment, a method for converting alternating current voltage signals to Ethernet in-line power includes converting an alternating current voltage signal to an approximate direct current voltage signal, adding at least one odd harmonic of the approximate direct current voltage signal to produce a compensated direct current voltage signal, and conditioning the compensated direct current voltage signal to produce an Ethernet in-line power signal.

Some embodiments of the invention provide numerous technical advantages. Some embodiments may benefit from some, none, or all of these advantages. According to one embodiment, a power converter is provided that requires less space, is less costly, and more efficient than traditional power converters. This may result in increased cost savings in the underlying device as well as smaller device size. Further, because of the reduced size, other components of the device may be made larger, resulting in additional cost savings.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which.

DETAILED DESCRIPTION OF EXAMPLE EMBODIMENTS OF THE INVENTION

Embodiments of the invention are best understood by referring to FIGS. 1A through 4 of the drawings, like numerals being used for like and corresponding parts of the various drawings.

Figure 1A:
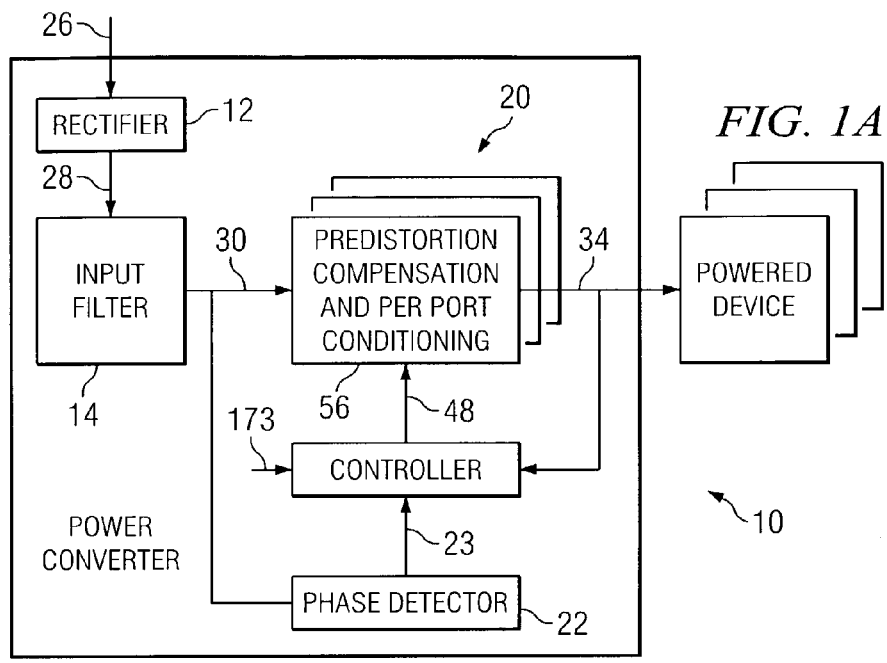
FIG. 1A is block diagram illustrating a power converter according to the teachings of the invention.

FIG. 1A is a block diagram illustrating a power converter for converting alternating current power to Ethernet in-line power. In this example, a power converter 10 receives input at node 26, which may be for example, an 85 to 265 Vrms signal, and converts that input to Ethernet in-line power at node 34. Ethernet in-line power is currently 48 volts direct current and is often current limited. In addition, in certain applications, providing Ethernet in-line power may include detecting whether a powered device, such as powered device 24, is truly an in-line power device or is a device that cannot accommodate in-line power. Such devices are often referred to as legacy devices.

Conventionally, power conversion from alternating current to Ethernet in-line power involves multiple power conversion stages. As used herein, a power conversion stage includes at least one of each of the following components: a switch, such as a field effect transistor, and a controller. Some stages may also include an input filter, an output filter, and a magnetic device, such as an inductor or a transformer. The use of multiple stages to convert alternating current to Ethernet in-line power can use too much equipment volume, may be inefficient, and may be costly. These problems are exacerbated when a detection stage is added to detect the presence of a legacy or in-line power device. Such a stage would often add a third stage to the power conversion. With only a single stage of power conversion, multiple powered devices require multiple power converters, resulting in port to port isolation at no additional cost.

According to the teachings of the invention, a single stage power converter is provided that converts AC power to Ethernet in-line power, which may include a detection portion, all in one stage. Such a power converter requires less space and is less costly than conventional systems, in one embodiment. This is primarily attributable to the removal of many of the components that are conventionally required for each power conversion stage. The teachings of the invention recognize that removal of such conventional structure from the various power conversion stages would result in a waveform of undesired characteristics, without compensation. In particular, the teachings of the invention recognize that extraordinarily large input and output filters would be required, in one embodiment, to produce a desirable waveform. The teachings of the invention recognize that an intermediate waveform may be modified through predistortion compensation, thus reducing the need for extraordinarily large input and output filters. In one particular embodiment, an intermediate waveform is compensated by adding third and fifth harmonics to reduce the size of valleys that occur in the waveform. By performing such predistortion compensation, the input and output filters of the power converter may take on an economical form. Example embodiments are described below in conjunction with FIGS. 1A through FIG. 4.

Power converter 10 includes a rectifier 12, an input filter 14, a predistortion compensation and per port conditioning block 20, a controller 18, and a phase detector 22. In one embodiment, forty-eight predistortion compensation and per port conditioning blocks 20 are provided for each power converter 10. This corresponds to forty-eight ports per Ethernet switch; however any suitable number of per port conditioning blocks may be utilized. Further, in one embodiment, one predistortion compensation and per port conditioning block 20 is provided for each connected power device 24.

Figure 1B:
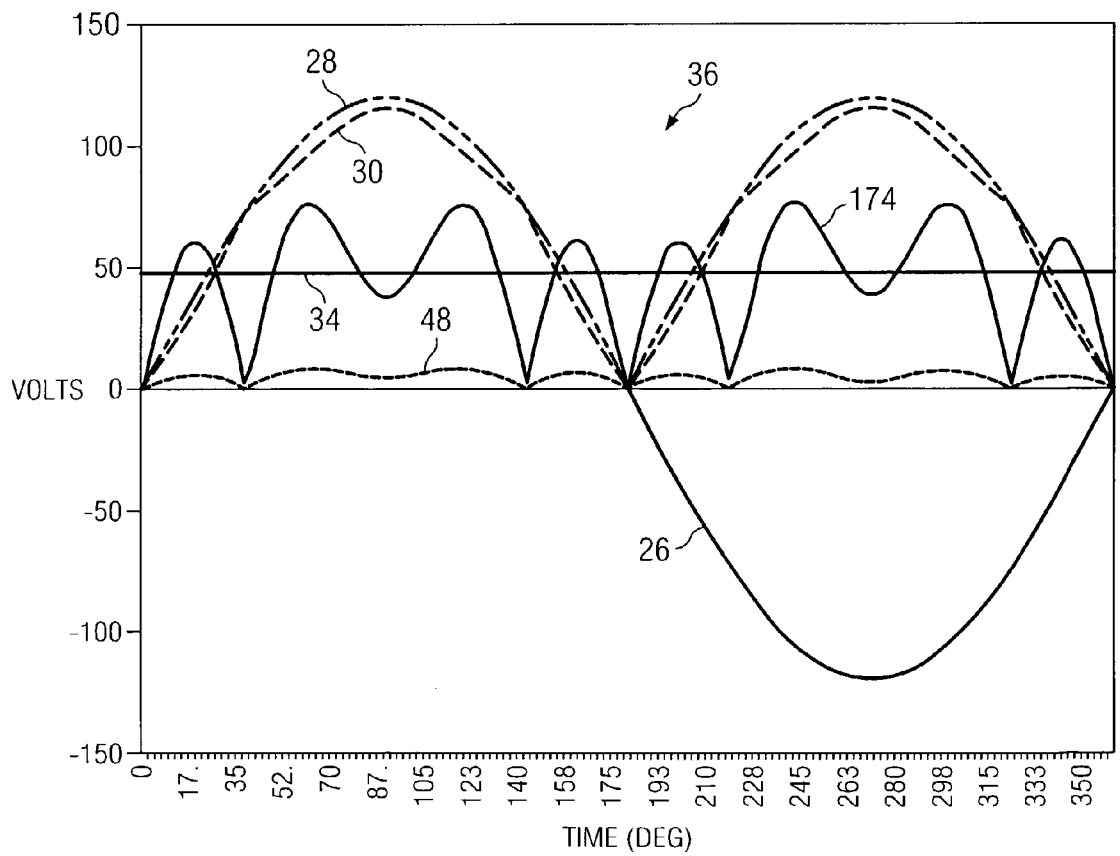
FIG. 1B is a series of curves showing the resulting wave form at various locations within the power converter of FIG. 1A.

Rectifier 12 receives an alternating current as its input and produces a rectified signal at node 28, which is the input to input filter 14. Example waveforms at nodes 26 and 28 are illustrated in FIG. 1B. Input filter 14 produces a filtered waveform at node 30, illustrated in FIG. 1B. As illustrated, waveform 30 may include a plurality of valleys 36. Higher frequency harmonics are present due to predistortion compensation and switching noise. The teachings of the invention recognize that correction of valleys 36 may be too costly to perform by an output filter alone.

Per port conditioning and predistortion compensation 20 addresses correcting valleys 36 by adding harmonics to waveform 30 to result in the waveform at node 32. Any suitable addition of waveforms may be utilized to result in a desired waveform 32; however, in one embodiment a plurality of odd harmonics are utilized. Odd harmonics are utilized because, theoretically, a square waveform may be produced exactly based upon an infinite number of odd harmonics and a rectified square wave is a flat line. In the present example, the rectified third and fifth harmonic of waveform 28 is added to result in waveform 32. Also illustrated in FIG. 1B is curve 48 corresponding to predistortion compensation signal 48 provided to pulse width modulator 162 (FIG. 3), as described in greater detail below. The output of predistortion compensation is provided at node 34, providing a resulting power signal on node 34 for use by a corresponding power device 24, illustrated as a constant direct current in FIG. 1B. Also illustrated in FIG. 1B is a power waveform at node 174 (FIG. 3), which corresponds to the power waveform before output filtering.

As described in greater detail below in conjunction with FIG. 3, per port conditioning involves, in one example, pulse width modulation, filtering, and switching from a filtered power signal to a zero power signal based upon the detection of either an in-line power device or a legacy device. In general, however, in addition to predistortion compensation, the per port conditioning scales the signal received at node 30 to forty-eight volts and provides further conditioning to better approximate a direct current voltage. The conditioned in-line power Ethernet waveform is provided at node 34 as illustrated in FIG. 1B. Phase detector 22 and controller 18 assist in the above described components performing their functions. Controller 18 may be programmed to specify the harmonics that will be added to waveform 30 by predistortion compensation. This information is referred to as predistortion compensation signal 48. In performing this function, phase detector 22 may detect the phase at node 30 and provide it to controller 18 over line 23. The phase is utilized to ensure the compensation harmonics are in phase with the input AC power. Controller 18 may also serve the additional purpose of determining which port of an Ethernet switch has a device connected to it, and thus potentially requires power.

Thus, according to the teachings of the invention, a single stage power conversion from alternating current to in-line Ethernet power may be effected. According to the described embodiment, a predistortion compensator is utilized to address deficiencies in the waveform that would otherwise require too costly filtering. Some embodiments of such an approach result in power converters that are less costly and require less space than conventional counterparts.

Figure 1C:
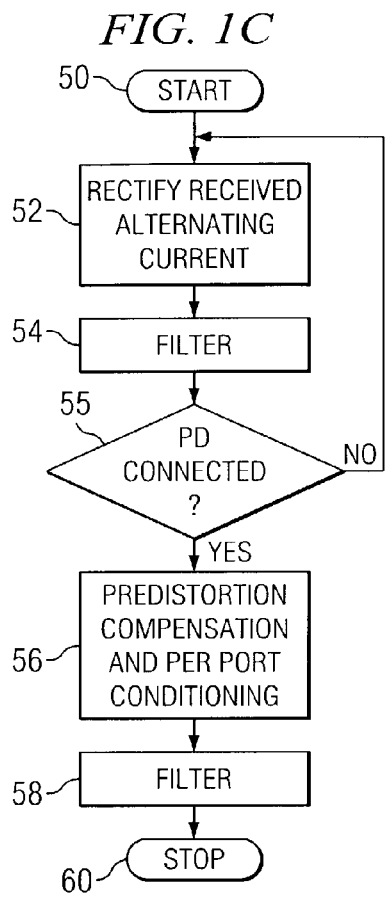
FIG. 1C is a flowchart illustrating a method for converting alternating current to Ethernet in-line power.

FIG. 1C is a flowchart illustrating a method for performing power conversion according to the teachings of the invention. Although the method described with reference to FIG. 1C may appear to correlate closely with the structure of FIG. 1A, any suitable structure may be utilized to perform the below described acts. The method begins at step 50. At step 52 the alternating current is rectified. Any suitable rectification approach may be utilized. At step 54 the rectified signal is filtered to make the waveform better approximate a direct current signal and to reduce harmonic content and switching noise from entering the input power line. The result of the waveform may appear similar to the waveform at node 30, illustrated in FIG. 1B. At step 55, a determination may be made of whether a particular port has a powered device 24 connected to it that potentially requires power. If such a device exists, processing continues at step 56. At step 56 predistortion compensation is performed, which involves adding harmonics of the waveform to help fill in valleys that remain in the filtered rectified signal. In one embodiment, this may involve adding a third and a fifth harmonic. In another embodiment it may involve adding only odd harmonics, and in yet another embodiment may involve adding either just even harmonics or both even and odd harmonics. This may involve pulse width modulating the signal to produce a regulated output and to get energy across isolation barrier 166 (FIG. 3). This is also a convenient way to do the predistortion. The controller 18 produces a setpoint input, or predistortion compensation signal 48 to pulse width modulator 162 of FIG. 3. The resulting signal may then be filtered at step 58 to produce an appropriate Ethernet in-line power signal. In addition, detection of whether the device to be powered is actually an in-line power device or is rather a legacy device, which does not require power, may be performed. It should be noted that providing in-line power to a legacy device would likely destroy the legacy device and thus detection of whether the connected device is a legacy device or an in-line power device is desirable. Based upon the result of detection, either the filtered in-line power signal or a zero power signal may be applied to the in-line power device. The method concludes at step 60.

Thus, power conversion may occur through using predistortion compensation in combination with other components to create distortions in the power waveform that allow the use of fewer components and stages than conventional power conversion by making more effective use of the input and output filters. In some embodiments this can be achieved with input and output filters that are not too costly. As a parallel task, a controller, such as controller 18, may monitor the output current or voltage to detect presence of an inline power device, a legacy device, short circuit, or open circuit. Controller 18 may force the setpoint input 48 of pulse width modulator 162 (FIG. 3) to zero. This allows the output voltage to go to zero, turning off the powered port.

Figure 2A:
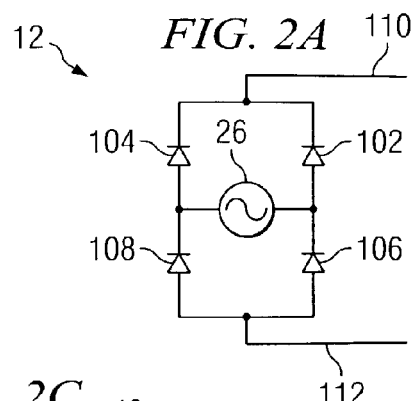
FIG. 2A is a circuit diagram illustrating one example of a rectifier of FIG. 1A.

FIG. 2A is an example of full wave bridge rectifier 12 that may be used in power converter 10; however, other types of rectifiers may be utilized. Rectifier 12 includes four diodes 102, 104, 106, and 108 that rectify an alternating current signal to produce a rectified output signal across nodes 110 and 112, corresponding to node 28 in this example.

Figure 2C:
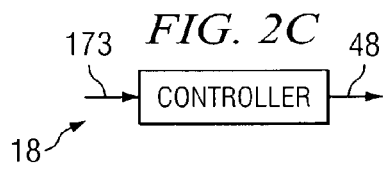
FIG. 2C is a block diagram of an example controller of FIG. 1A showing certain outputs of the controller.
Figure 2B:
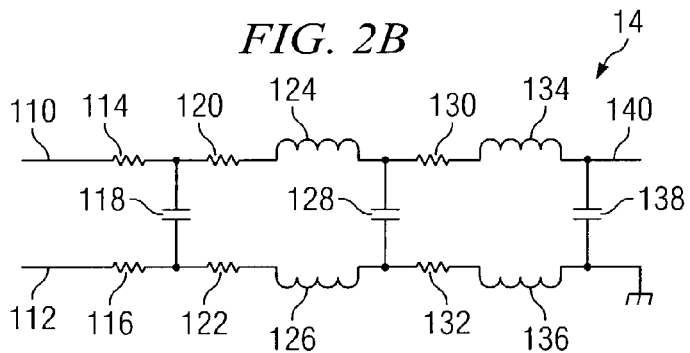
FIG. 2B is a circuit diagram illustrating one example of the input filter of FIG. 1A.

FIG. 2B is an example input filter 14; however other suitable input filters may be used. In this example input filter 14 receives a rectified alternating current signal across nodes 110 and 112. Input filter 14 includes, in this example, a $5^{th}$ order LC filter comprising capacitor 118, inductor 124 and 126, capacitor 128, inductor 134 and 136, and capacitor 138. Also shown are equivalent series impedances 120, 122, 130 and 132. Equivalent series impedances 114 and 116 model connector and other parasitic losses. The output of input filter 14 is provided at node 140, which corresponds to node 30 in FIGS. 1A and 1B. Appropriate selection of the resistors, inductors, and capacitors of FIG. 2B may be performed by one skilled in the art to result in a desired combination of cost, size, regulatory compliance and resulting waveform at node 30 and node 28. In general, the greater the size of the input filter 14 the smaller the valleys 36 of waveform at node 30 and the lower harmonic content and noise delivered back to the alternating current power source 26.

FIG. 2C is a block diagram illustrating generation of predistortion compensation signal 48 by controller 18. Predistortion compensation signal 48 includes harmonics of rectified signal 28. In one embodiment, the harmonics are in phase and are the fundamental plus 0.3 times the $3^{rd}$ harmonic and 0.35 times the fifth harmonic; however, other suitable harmonics may be used. Phase detector 22 allows controller 18 to generate predistortion compensation signal 48 to be in phase with rectified signal 28. In one embodiment, phase detector 22 may be a well known zero crossing detector; however, other phase detectors may be used.

In one embodiment, predistortion compensation spreads the energy in power signal 28 across many harmonics. This reduces the energy in the fundamental frequency component, moving the energy to higher frequency components, which are much easier to filter.

Figure 3:
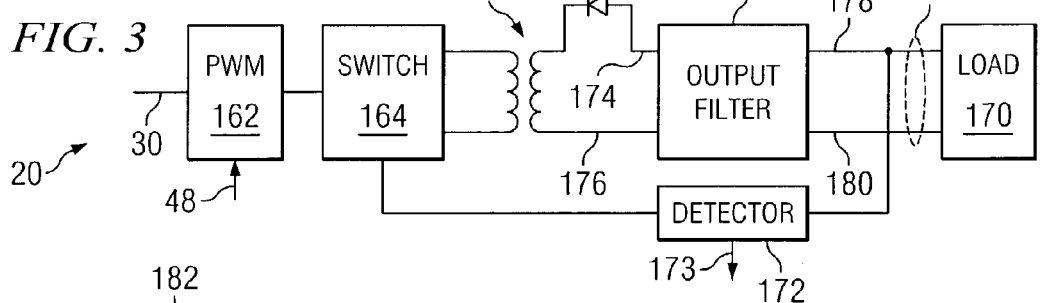
FIG. 3 is a block diagram illustrating one example of the per port conditioning block of FIG. 1A.

If controller 18 detects an in-line power device, it outputs predistortion compensation signal 48 to the setpoint input of pulse width modulator 162 of predistortion compensation and per port conditioning block 20 (FIGS. 1A and 3). In one embodiment, such detection is performed through use of detector 172 of FIG. 3 in which a signal 173 indicative of the presence, or lack thereof, of an in-line device is provided to controller 18; however, other approaches may be used. If controller 18 detects a legacy Ethernet device, a zero volt signal is applied to the setpoint input of pulse width modulator 162 (FIG. 3), shutting off power to the load. Other signals useful in detecting the presence or absence of load 170 can be added to predistortion compensation signal 48 and reproduced on node 34. Controller 18 may also be connected to a host processor. Controller 18 may take any suitable form and may be programmed to provide appropriate harmonics based on the desired waveform. One example of controller 18 is an embedded microcontroller, Microchip PIC16F877.

FIG. 3 is a block diagram illustrating example components for predistortion compensation and per port conditioning block 20 of FIG. 1A; however other components may be utilized. In this example, predistortion compensation and per port conditioning block 20 receives the compensated signal at node 30 and produces an in-line power signal at node 34 having a 48 volt magnitude and more closely approximating direct current. In one embodiment, predistortion compensation and per port conditioning block 20 includes a pulse width modulator 162, a switch 164, a transformer 166, a rectifier diode 167, and an output filter 168. Also illustrated in FIG. 3 is load 170, which may also be referred to as powered device 24. Pulse width modulator 162 modulates the rectified signal at node 30 according to predistortion compensation signal 48 to produce a signal at node 174 containing frequency components containing higher harmonics of the rectified signal at node 28. Switch 164, transformer 166 and rectifier 167 provide isolation between the alternating current and the load. Output filter 48 receives the transformed signal at nodes 174 and 176 and filters the signal to remove the AC content still present to closely approximate direct current. The output of output filter 168 is produced on lines 178 and 180, which are provided to load 170. Nodes 178 and 180 correspond to node 34 of FIG. 1A. Detector 172 monitors the output voltage for feedback to pulse width modulator 162 and controller 18.

Measuring the output voltage at node 178 by detector 172 and current through switch 164 determines the impedance of load 170. The impedance of load 170 indicates if an in-line power device or a legacy device or legacy device is connected to port 34. Legacy devices have a relatively small input resistance such as 150 ohms, whereas in-line power devices have a relatively large input signature resistance such as 25 Kilohms. Controller 18 enables power at the output by applying a predistorted compensation signal over line 48 to the setpoint input of pulse width modulator 162. If a zero volt signal is applied to setpoint input 48 of pulse width modulator 162, the power to load 170 is turned off, preventing damage to a legacy device.

Figure 4:
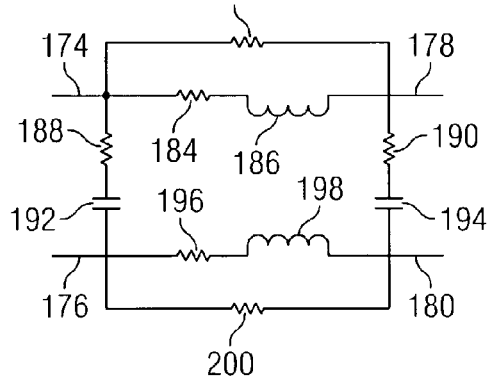
FIG. 4 is a circuit diagram illustrating an example output filter for the per port conditioning block of FIG. 1A.

FIG. 4 is a schematic diagram illustrating one example of output filter 68 of FIG. 3; however, other suitable output filters may be used. Although the predistortion compensation performed in accordance with the invention conditions the power signal to address resulting valleys, in this embodiment output filter 68 is relatively large, yet significantly smaller than a filter producing equivalent output ripple without using predistortion, to further condition the signal to desired direct current characteristics. Output filter 168 includes, in this example, a $3^{rd}$ order LC filter comprising capacitor 192, inductors 186 and 198, and capacitor 194. Also shown are equivalent series impedances 188, 184, 196, and 190. Resistors 182 and 200 provide damping. Output filter produces its output on nodes 178 and 180. In one example embodiment, the output filter components are selected such that the output filter combined with the input filter and the frequency spreading of the rectification and predistortion compensation give the desired output ripple and desired harmonic content delivered back to the power source.

Although some embodiments of the present invention have been described in detail, it should be understood that various changes, substitutions, and alterations can be made thereto without departing from the spirit and scope of the invention as defined by the appended claims.

What is claimed is:

1. A method for converting alternating current voltage signals to Ethernet in-line power, the method comprising:
rectifying the alternating current voltage signals to produce a rectified voltage signal;

filtering a signal indicative of the rectified voltage signal to produce a filtered voltage signal;

pulse width modulating a signal indicative of the filtered voltage signal and in conjunction adding at least one odd harmonic of a signal indicative of the rectified voltage signal to a signal indicative of the filtered voltage signal to produce a compensated voltage signal, thereby spreading the spectral content and reducing the size of valleys in the filtered voltage signal;

filtering a signal indicative of the filtered voltage signal to produce an output direct current voltage signal; and detecting the presence of an Ethernet in-line power device and in response providing a signal indicative of the output voltage signal to the detected in-line power device.

2. The method of claim 1, wherein the signal indicative of the rectified voltage signal is the rectified voltage signal, the signal indicative of the filtered voltage signal is the filtered voltage signal, the signal indicative of the compensated voltage signal is the compensated voltage signal, and the signal indicative of the output voltage signal is the output voltage signal.

3. The method of claim 1, wherein the pulse width modulating, the filtering of a signal indicative of the modulated signal, and the detecting the presence of an Ethernet in-line power device comprises performing these acts for each of a plurality of in-line power devices.

4. The method of claim 1, wherein adding at least one odd harmonic comprises adding the third and fifth harmonics of the signal indicative of the rectified voltage signal.

5. The method of claim 4, wherein the amplitude of the third harmonic is approximately 0.3 times the amplitude of the signal indicative of the rectified voltage signal and the fifth harmonic has an amplitude of approximately 0.1 times the amplitude of the signal indicative of the rectified voltage signal.

6. The method of claim 1, wherein detecting the presence of an Ethernet in-line power device comprises detecting the input impedance of the Ethernet in-line power device.

7. The method of claim 1, where the scaled voltage signal has a magnitude of approximately 48 volts.

8. A method for converting alternating current voltage signals to Ethernet in-line power, the method comprising:
low pass filtering the alternating current voltage signal to produce a filtered signal;
spreading the energy in the filtered signal over a plurality of different frequencies higher than a fundamental frequency of the filtered signal to produce a spread signal;
low pass filtering the spread signal to produce a direct current voltage signal; and
detecting the presence of an Ethernet in-line power device and in response providing a signal indicative of the direct current voltage signal to the detected in-line power device.

9. The method of claim 8, wherein spreading the energy comprises spreading the energy by a rectifier.

10. The method of claim 8, wherein spreading the energy comprises spreading the energy by modulating, with a modulating signal, a setpoint input of a power supply.

11. The method of claim 10, wherein the modulating signal includes a plurality of odd harmonics of the alternating current voltage signal.

12. The method of claim 11, wherein the modulating signal includes the third harmonic and the fifth harmonic of the alternating current voltage signal.

13. A method for converting alternating current voltage signals to Ethernet in-line power, the method comprising:
rectifying the alternating current to produce a rectified voltage signal;
filtering a signal indicative of the rectified voltage signal to produce a filtered voltage signal;
adding at least one harmonic of a signal indicative of the filtered voltage signal to a signal indicative of the filtered voltage signal to produce a compensated voltage signal; and
conditioning a signal indicative of the compensated voltage signal to produce a direct current voltage signal of a desired magnitude.

14. The method of claim 13, wherein the signal indicative of the rectified voltage signal is the rectified voltage signal, the signal indicative of the filtered voltage signal is the filtered voltage signal, and the signal indicative of the compensated voltage signal is the compensated voltage signal.

15. The method of claim 13, wherein conditioning a signal indicative of the compensated voltage signal comprises the acts of pulse width modulation and filtering.

16. The method of claim 15, and further comprising detecting the presence of an Ethernet in-line power device and in response providing a signal indicative of the direct current voltage signal to the detected device.

17. The method of claim 16, wherein detecting comprises detecting the input resistance of the in-line power device.

18. The method of claim 16, wherein the Ethernet in-line power device is denied power by disabling the pulse width modulation.

19. The method of claim 13, wherein adding at least one odd harmonic comprises adding the third and fifth harmonics of the signal indicative of the filtered voltage signal.

20. The method of claim 19 wherein the amplitude of the third harmonic is approximately 0.3 times the amplitude of the signal indicative of the filtered voltage signal and the fifth harmonic has an amplitude of approximately 0.1 times the amplitude of the signal indicative of the filtered voltage signal.

21. The method of claim 13, wherein the desired magnitude is 48 volts.

22. A system for providing Ethernet in-line power to a plurality of devices, the system comprising:
a rectifier operable to rectify an alternating current power supply to produce a rectified signal;
a filter operable to filter a signal indicative of rectified signal and produce a filtered signal; and
for each of a plurality of Ethernet in-line power devices:
a predistortion compensator operable to add at least one odd harmonic of a signal indicative of the filtered signal to a signal indicative of the filtered signal to produce a compensated signal; and
an output filter operable to filter a signal indicative of the compensated signal to produce a filtered output signal.

23. The system of claim 22, and further comprising, for each of the plurality of Ethernet in-line power devices, a detector operable to detect the presence of an Ethernet in-line power device and in response provide a signal indicative of the output voltage signal to the in-line power device.

24. The system of claim 23, wherein the detector comprises circuitry operable to detect the input resistance of the in-line power device.

25. The system of claim 22, wherein the signal indicative of the rectified signal is the rectified signal, the signal indicative of the filtered voltage signal is the filtered signal, and the signal indicative of the compensated signal is the compensated signal.

26. The system of claim 22, wherein adding at least one odd harmonic comprises adding the third and fifth harmonics of the signal indicative of the filtered voltage signal.

27. The system of claim 26, wherein the amplitude of the third harmonic is approximately 0.3 times the amplitude of the signal indicative of the filtered voltage signal and the fifth harmonic has an amplitude of approximately 0.1 times the amplitude of the signal indicative of the filtered voltage signal.

28. A system for providing Ethernet in-line power to a plurality of devices, the system comprising:

a means for rectifying an alternating current power supply to produce a rectified signal;

a means for filtering a signal indicative of the rectified signal to produce a filtered signal; and for each of a plurality of Ethernet in-line power devices:

a means for adding at least one odd harmonic of a signal indicative of the filtered signal to the filtered signal to produce a compensated signal; and a means for filtering a signal indicative of the compensated signal to produce an output voltage signal.

29. The system of claim 28, and further comprising a means for detecting the presence of an Ethernet in-line power device and in response providing a signal indicative of the output voltage signal to the in-line power device.

* * * * *